(12) United States Patent
de Borchgrave et al.

(10) Patent No.: US 11,878,316 B2
(45) Date of Patent: Jan. 23, 2024

(54) SLIDING DRAWER DRY FILTRATION SYSTEM FOR A PAINT BOOTH

(71) Applicant: Gallagher-Kaiser Corporation, Troy, MI (US)

(72) Inventors: Adrien de Borchgrave, Plymouth, MI (US); Bruce Roesler, Wixom, MI (US)

(73) Assignee: Gallagher-Kaiser Corporation, Troy, MI (US)

( * ) Notice: Subject to any disclaimer, the term of this patent is extended or adjusted under 35 U.S.C. 154(b) by 10 days.

(21) Appl. No.: 17/551,934

(22) Filed: Dec. 15, 2021

(65) Prior Publication Data

US 2022/0184651 A1 Jun. 16, 2022

Related U.S. Application Data

(60) Provisional application No. 63/125,528, filed on Dec. 15, 2020.

(51) Int. Cl.
*B05B 14/43* (2018.01)
*B01D 46/00* (2022.01)
*B05C 15/00* (2006.01)

(52) U.S. Cl.
CPC .......... *B05B 14/43* (2018.02); *B01D 46/0006* (2013.01); *B05C 15/00* (2013.01)

(58) Field of Classification Search
None
See application file for complete search history.

(56) References Cited

U.S. PATENT DOCUMENTS

| | | | | |
|---|---|---|---|---|
| 3,719,030 A | * | 3/1973 | Blankemeyer | B01D 46/76 95/286 |
| 3,902,455 A | * | 9/1975 | Lehmann | B05B 16/90 55/354 |
| 4,354,451 A | * | 10/1982 | Vohringer | B01D 46/04 118/628 |
| 4,409,009 A | * | 10/1983 | Lissy | B01D 46/2407 118/DIG. 7 |
| 4,471,715 A | * | 9/1984 | Gubler | B05B 16/25 118/DIG. 7 |
| 4,504,292 A | * | 3/1985 | Vohringer | B05B 14/45 55/432 |
| 4,567,818 A | * | 2/1986 | Napadow | B05B 14/46 454/55 |

(Continued)

*Primary Examiner* — Jethro M. Pence
(74) *Attorney, Agent, or Firm* — Dickinson Wright PLLC (57) ABSTRACT

A paint booth assembly includes a dry filtration system for filtering paint particles from a downdraft of air. The dry filtration system includes at least one filter module disposed in a paint filtration portion of a paint booth for receiving the downdraft of air. The filter module includes a plurality of filter drawers sequentially arranged relative to one another along a flow path of the downdraft of air, with each of the filter drawers slideable relative to a side wall between filtering and cleaning positions. In the filtering position, a disposable filter within the respective filter drawer is disposed within the paint filtration portion for filtering paint particles from the downdraft of process air. In the cleaning position, the respective filter drawer is slid out into an external environment of the paint booth for allowing the disposable filter to be removed and replaced by an operator.

13 Claims, 10 Drawing Sheets

(56) References Cited

U.S. PATENT DOCUMENTS

| | | | | |
|---|---|---|---|---|
| 4,607,592 A * | 8/1986 | Richter | B05B 14/465 | 118/DIG. 7 |
| 4,662,309 A * | 5/1987 | Mulder | B05B 14/48 | 118/308 |
| 4,770,118 A * | 9/1988 | Vohringer | B01D 46/76 | 55/497 |
| 5,023,116 A * | 6/1991 | Williams | B05B 16/60 | 118/DIG. 7 |
| 5,063,835 A * | 11/1991 | Rockx | B05B 16/60 | 118/326 |
| 5,178,679 A * | 1/1993 | Josefsson | B05B 16/95 | 118/309 |
| 5,224,974 A * | 7/1993 | Johnson | B05B 14/43 | 55/525 |
| 5,256,201 A * | 10/1993 | Gelain | B05B 14/435 | 118/308 |
| 5,279,631 A * | 1/1994 | Pingel | B05B 14/435 | 118/DIG. 7 |
| 5,397,394 A * | 3/1995 | Orr | B05B 16/60 | 454/52 |
| 5,618,333 A * | 4/1997 | Buchholz, Jr. | B05B 14/49 | 96/371 |
| 5,728,185 A * | 3/1998 | Buchholz, Jr. | B05B 14/49 | 55/486 |
| 5,743,958 A * | 4/1998 | Shutic | B05B 14/43 | 118/308 |
| 5,782,943 A * | 7/1998 | O'Ryan | B05B 14/48 | 55/332 |
| 5,922,130 A * | 7/1999 | Mosser | B05B 16/60 | 96/407 |
| 6,071,558 A * | 6/2000 | Shutic | B05B 7/1454 | 427/195 |
| 6,361,605 B1 * | 3/2002 | Shutic | B05B 7/1454 | 118/308 |
| 6,447,585 B1 * | 9/2002 | Buchholz, Jr. | B01D 47/05 | 250/435 |
| 6,461,431 B1 * | 10/2002 | Ainsworth | B05B 16/25 | 118/309 |
| 6,679,193 B2 * | 1/2004 | Shutic | B05B 7/1454 | 118/313 |
| 6,723,169 B2 * | 4/2004 | Hihn | B05B 14/48 | 118/309 |
| 6,800,138 B2 * | 10/2004 | Hihn | B05B 7/1454 | 118/308 |
| 6,852,165 B2 * | 2/2005 | Ainsworth | B05B 14/43 | 118/309 |
| 6,929,698 B2 * | 8/2005 | Shutic | B05B 7/1454 | 118/712 |
| 6,964,708 B2 * | 11/2005 | Hihn | B05B 16/60 | 454/52 |
| 7,001,262 B2 * | 2/2006 | Tong | B05B 16/60 | 454/52 |
| 7,166,164 B2 * | 1/2007 | Shutic | B05B 7/1454 | 118/308 |
| 7,195,672 B2 * | 3/2007 | Ghilardi | B05B 16/60 | 118/DIG. 7 |
| 7,247,205 B2 * | 7/2007 | Shutic | B05B 7/1468 | 118/308 |
| 7,837,130 B1 * | 11/2010 | Lowery | B05B 12/36 | 118/232 |
| 7,959,722 B2 * | 6/2011 | Wieland | B05B 14/437 | 454/55 |
| 7,988,769 B2 * | 8/2011 | Wieland | B05B 16/60 | 454/55 |
| 8,377,177 B2 | 2/2013 | Holzheimer et al. | | |
| 8,535,420 B2 * | 9/2013 | Holler | B05B 14/40 | 55/385.2 |
| 9,321,070 B2 * | 4/2016 | Link | B05B 14/43 | |
| 9,333,521 B2 * | 5/2016 | Holler | B01D 46/66 | |
| 9,364,845 B2 * | 6/2016 | Holler | B01D 46/0027 | |
| 9,616,453 B2 * | 4/2017 | Sakita | B05B 14/437 | |
| 9,833,805 B2 * | 12/2017 | Schmeinck | B01D 46/0013 | |
| 9,950,335 B2 * | 4/2018 | Roeckle | B05B 14/43 | |
| 9,968,956 B2 * | 5/2018 | Miwa | B05C 15/00 | |
| 10,335,820 B2 * | 7/2019 | Manabe | B05B 15/72 | |
| 10,350,626 B2 * | 7/2019 | Covizzi | B01D 46/0006 | |
| 10,350,627 B2 | 7/2019 | Covizzi et al. | | |
| 10,512,930 B2 * | 12/2019 | Sekigawa | B05B 14/435 | |
| 10,596,504 B2 * | 3/2020 | Wieland | B01D 46/0013 | |
| 10,646,891 B2 * | 5/2020 | Zebisch | B05B 16/40 | |
| 11,192,132 B2 * | 12/2021 | Koike | F24F 7/00 | |
| 11,291,340 B2 * | 4/2022 | Taylor | A47L 9/1683 | |
| 11,458,498 B2 * | 10/2022 | Lee | B05B 14/412 | |
| 11,484,903 B2 * | 11/2022 | Lee | B05B 14/43 | |
| 11,491,503 B2 * | 11/2022 | Saito | B01D 46/12 | |
| 11,596,965 B2 * | 3/2023 | Salazar | B05B 16/40 | |
| 2005/0045036 A1 * | 3/2005 | Vetter | B03C 3/60 | 96/69 |
| 2005/0160711 A1 * | 7/2005 | Yang | D04H 1/4218 | 55/528 |
| 2006/0196416 A1 * | 9/2006 | Shutic | B05B 7/1454 | 118/308 |
| 2006/0243202 A1 * | 11/2006 | Thelen | B01D 46/0036 | 118/309 |
| 2007/0215042 A1 * | 9/2007 | Shutic | B05B 14/435 | 118/326 |
| 2011/0034119 A1 * | 2/2011 | Mase | B24C 9/00 | 451/88 |
| 2013/0122188 A1 * | 5/2013 | Fritz | B08B 17/04 | 118/326 |
| 2014/0134339 A1 * | 5/2014 | Holler | B01D 46/0041 | 427/331 |
| 2015/0375251 A1 * | 12/2015 | Roeckle | B05B 14/43 | 95/286 |
| 2016/0023231 A1 | 1/2016 | Schmeinck et al. | | |
| 2016/0250657 A1 * | 9/2016 | Holler | B05B 14/437 | 427/189 |
| 2018/0207669 A1 * | 7/2018 | Zebisch | B05B 16/40 | |
| 2018/0236476 A1 * | 8/2018 | Covizzi | B05B 14/43 | |
| 2018/0311695 A1 * | 11/2018 | Saito | B05B 16/40 | |
| 2019/0247878 A1 * | 8/2019 | Röckle | B01D 46/62 | |
| 2021/0260614 A1 * | 8/2021 | Saito | B05B 14/43 | |
| 2021/0370211 A1 * | 12/2021 | Wieland | B01D 46/0013 | |
| 2022/0055058 A1 * | 2/2022 | Baizel | B01D 46/0031 | |
| 2022/0072461 A1 * | 3/2022 | Klaiber | B01D 46/12 | |
| 2022/0134371 A1 * | 5/2022 | Poboss | B01D 46/62 | 427/226 |
| 2022/0152644 A1 * | 5/2022 | Zimmerman | B05B 14/43 | |

\* cited by examiner

SLIDING DRAWER DRY FILTRATION SYSTEM FOR A PAINT BOOTH

CROSS-REFERENCE TO RELATED APPLICATION

This application claims the benefit of U.S. Provisional Patent Application Ser. No. 63/125,528 filed on Dec. 15, 2020, the entire disclosure of which is incorporated herein by reference.

BACKGROUND OF THE INVENTION

1. Field of the Invention

The subject disclosure relates in general to the field of paint booths, and more particularly to a dry filtration system for capturing and removing paint particles from a downdraft of process air in a paint booth.

2. Description of the Prior Art

This section provides background information related to the present invention which is not necessarily prior art.

Paint booths are used in many industrial applications for applying paint or other coatings to components or assemblies. However, not all of the paint is transferred to the components or assemblies in the painting process, resulting in paint overspray that becomes entrained within a downdraft of process air within the paint booth. These paint particles must be removed and purified from the downdraft of process air before the air can be released into the environment or introduced back into the paint booth for subsequent use as downdraft air.

In paint booth applications utilizing a large amount of paint consumption, such as paint booths for painting vehicle bodies, it is common to utilize a wet scrubber based filtration system to remove the paint from the downdraft of process air. One such example is disclosed in Applicant's U.S. Pat. No. 11,085,058. However, wet scrubbers are known to require a large amount of energy usage such as is required to circulate the large amounts of water through the paint booth assembly to capture the paint overspray and treat the resultant sludge. The processing of the resultant sludge can also be cost-intensive due to the requisite processing and potential use of chemicals to treat and dispose of the paint sludge. Additionally, due to the presence of water in the paint booth, the downdraft air necessarily takes up moisture that must be later processed out of the air before reintroduction into the paint booth, resulting in additional energy consumption.

Accordingly, in some applications in which the component or assembly is not as large as a vehicle body and thus less paint consumption is required, or where lower volume production requirements are present for the components or assemblies to be painted, it is common to utilize a dry filtration system in lieu of the wet scrubber filtration systems, namely because dry filtration systems have lower energy use requirements relative to their wet scrubber counterparts. In these dry filtration systems, the downdraft of air is passed through a filter module including at least one dry filter before the filtered air is released to the environment or recirculated back into the paint booth. When the dry filter becomes loaded excessively with paint particles, the filter module is taken "off-line" by a paint booth operator and replaced with a new filter module. Two such examples are disclosed in U.S. Pat. No. 10,350,627 and US Patent Application Publication No. 2016/00232321. However, the removal and replacement of the filter modules in these dry filtration systems is a time consuming process, namely because the entire filter module, which is a bulky structure, must be handled, removed and disposed of by the paint booth operator. These prior art dry filtration systems often require complicated rail structures or lifting trucks to remove and replace the bulky filter modules. Once removed, the bulky filter modules can also create disposal issues due to their large size.

Accordingly, a continuing need exists for a dry filtration system for a paint booth that provides for quicker and easier removal and disposal of the filters from the filter modules.

SUMMARY OF THE INVENTION

This section provides a general summary of the invention and is not intended to be a comprehensive disclosure of its full scope, aspects, objectives, and/or all of its features.

A paint booth assembly according to the subject disclosure includes a dry filtration system for filtering paint particles from a downdraft of air. The paint booth assembly includes a paint booth having a pair of side walls, and a grated floor extending between the pair of side walls to separate the paint booth between a spray portion disposed above the grated floor and a paint filtration portion disposed below the grated floor. At least one filter module is disposed in the paint filtration portion for receiving a downdraft of process air including entrained paint particles from the spray portion. The filter module includes a plurality of filter drawers sequentially arranged relative to one another along a flow path of the downdraft of air and each defining a filter compartment housing at least one disposable filter. Each of the filter drawers are slideably connected to the paint booth and slideable relative to one of the side walls between filtering and cleaning positions. In the filtering position, the filter compartment of the respective filter drawer is disposed within the paint filtration portion of the paint booth for filtering paint particles from the downdraft of process air. In the cleaning position, the filter compartment of the respective filter drawer is disposed in an outside environment of the paint booth for allowing the at least one disposable filter to be removed and replaced by a paint booth operator.

The filter module having a plurality of slideable filter drawers allows the disposable filters to be more easily and quickly replaced relative to the prior art designs which require the removal and replacement of the entire filter module from the paint booth, and thus a more complicated and cumbersome filter replacement process. In contradistinction, the subject dry filtration system including at least one filter module having a plurality of slideable filter drawers allows selective disposable filters to be discretely and individually replaced by a paint booth operator, while leaving the other filter drawers in the filter module "on-line" and in the closed position for continuing to filter the paint particles from the downdraft of process air. Thus, the filter module in accordance with the subject invention reduces the maintenance/labor requirements, and provides a solution which allows for faster disposable filter replacement relative to the prior art designs.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Example embodiments will now be described more fully with reference to the accompanying drawings. The example embodiments are provided so that this disclosure will be thorough and fully convey the scope to those skilled in the art. Numerous specific details are set forth such as examples of specific components, devices, mechanisms, assemblies, and methods to provide a thorough understanding of various embodiments of the present disclosure. It will be apparent to those skilled in the art that specific details need not be employed, that example embodiments may be embodied in many different forms, and that neither should be construed to limit the scope of the disclosure.

Referring to the drawings, wherein like numerals indicate corresponding parts throughout the several views, a paint booth assembly 20 is generally shown in FIGS. 1-5 and includes a paint booth 22 including a dry filtration system 24 for removing paint particles from a downdraft of air 25 in the paint booth 22. The paint booth 22 includes a pair of side walls 26 that extend from an entry end 28 to an exit end 30 for receiving a vehicle 32, or other component or assembly, to be painted. A conveyor 34 is located centrally between the pair of side walls 26 and extends along a central plane P from the entry end 28 to the exit end 30 to convey the vehicle 32 to be painted along the paint booth 22. Although described and illustrated in relation to a paint booth having a conveyor, it should be appreciated that the conveyor is not a requirement and could be omitted without departing from the scope of the subject disclosure. A grated floor 36 extends between the pair of side walls 26 to separate the paint booth 22 between a spray portion 38 disposed above the grated floor 36 and a paint filtration portion 40 disposed below the grated floor 36. The grated floor 36 defines a plurality of openings to allow the downdraft of air 25 to pass from the spray portion 38 to the paint filtration portion 40, while also allowing a paint booth operator 39 to move about the spray portion 38 of the paint booth 22 and access and service/clean equipment located inside the paint booth 22. A conveyor support 41 extends from each of the side walls 26 to provide structural support to the conveyor 34 and the grated floor 36.

Figure 1:
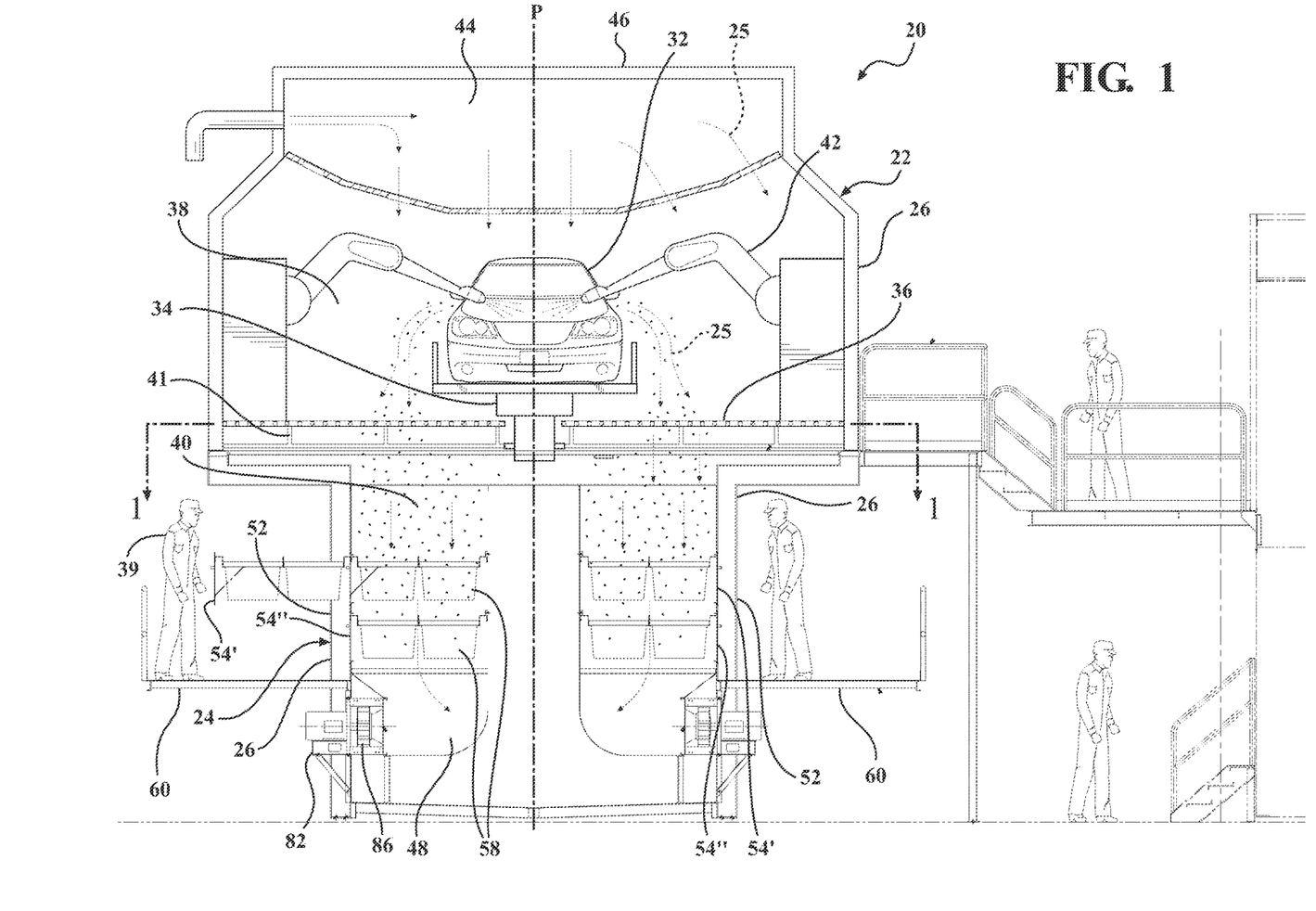
FIG. 1 is a cross-sectional view of a paint booth assembly illustrating a dry filtration system including at least one filter module disposed in a paint filtration portion of a paint booth and having a plurality of filter drawers sequentially arranged relative to one another along a flow path of downdraft air, with each of the filter drawers slideable relative to a side wall of the paint booth between a filtering position for filtering paint from the downdraft air and a cleaning position for allowing a paint booth operator to remove at least one disposable filter from the slideable filter drawer.

As best illustrated in FIG. 1, a number of paint applicators 42 are typically placed in the paint booth 22 to apply paint particles to the vehicle 32. For example, the paint applicators 42 can include robot-arm-type paint applicators, rotary-bell type paint applicators or the like. As is known in the art, the paint applicators 42 can include a pair of paint applicators 42 that are typically placed on opposite sides of the central plane P and the conveyor 34 to allow the vehicle 32 to be painted from opposite sides at the same time. A plenum 44 extends along a top portion 46 of the paint booth 22 to introduce the downdraft of air 25 into the spray portion 38 of the paint booth 22 to capture and direct an overspray of paint particles that are not applied to the vehicle 32 in a downdraft of process air from the spray portion 38, through the grated floor 36 towards the paint filtration portion 40.

As best illustrated in FIGS. 1-4 and 6-10, the paint filtration portion 40 of the paint booth 22 includes the dry filtration system 24 for filtering the paint particles entrained within the downdraft of process air 25 as a flow of the downdraft air 25 travels in a flow path through the paint filtration portion 40 and towards an exhaust air chamber 48 disposed in fluid communication with the paint filtration portion 40 for subsequent routing to an exhaust air duct 50. As best illustrated in FIGS. 1-4, the exhaust air chamber 48 is disposed below the paint filtration portion 40, and the exhaust air duct 50 is disposed in fluid communication with the exhaust air chamber 48 and preferably extends outwardly from one of the side walls 26 of the paint booth 22 for allowing cleaned or filtered air to travel to an exhaust air fan for recirculation and potential later introduction into the plenum 44 as recycled downdraft of air.

The dry filtration system 24 includes at least one filter module 52 having a plurality of filter drawers 54 sequentially arranged relative to one another along the flow path of downdraft air through the respective filter module 52. For clarification, and as illustrated in the Figures, the flow path of downdraft air passes from the spray portion 38 through the paint filtration portion 40 (and directed through the at least one filter module 52) and then to the exhaust air chamber 48. Each of the filter drawers 54 defines a filter compartment 56 that houses at least one disposable filter 58 for filtering the downdraft air as it serially passes through the respective filter drawer 54. As best illustrated in FIGS. 1, 3-4 and 7, each of the plurality of filter drawers 54 are slideably connected to one of the side walls 26 of the paint booth 22 and slideable from a filtering (or closed) position wherein the filter compartment 56 is disposed within the paint filtration portion 40 of the paint booth 22 for filtering the downdraft of air with the at least one disposable filter 58 to a cleaning (or open) position wherein the filter compartment 56 is moved or slid to an outside environment of the paint booth 22 for allowing the at least one disposable filter 58 to be removed and replaced by the paint booth operator 39 such as after the disposable filter 58 has been filled or loaded up with filtered paint particles.

As best illustrated in FIG. 1, a filter drawer access platform 60 can extend along the side wall 26 of the paint booth 22 adjacent the at least one filter module 52 for allowing the paint booth operator 39 to individually and selectively slide the filter drawers 54 between the filtering and cleaning positions to change their respective disposable filters 58. Once a new disposable filter is placed in the filter compartment 56 by the paint booth operator 39, the filter drawer 54 is slid back into the paint filtration portion 40 of the paint booth 22 and back "on-line" for filtering the downdraft of air passing through the paint filtration portion 40. The filter module 52 having a plurality of slideable filter drawers 52 allows for the disposable filters 58 to be more easily and quickly replaced relative to the prior art designs which require the removal and replacement of the entire filter module 52 from the paint booth, which as explained previously requires the entire filter module 52 to be taken "off-line", resulting in a more complicated and cumbersome filter replacement process. In contradistinction, the subject dry filtration system 24 including at least one filter module 52 having a plurality of slideable filter drawers 52 allows selective disposable filters 58 to be discretely and individually replaced by a paint booth operator 39, while leaving the other filter drawers 52 in the filter module 52 "on-line" and in the closed position for continuing to filter the paint particles from the downdraft of process air.

Figure 3:
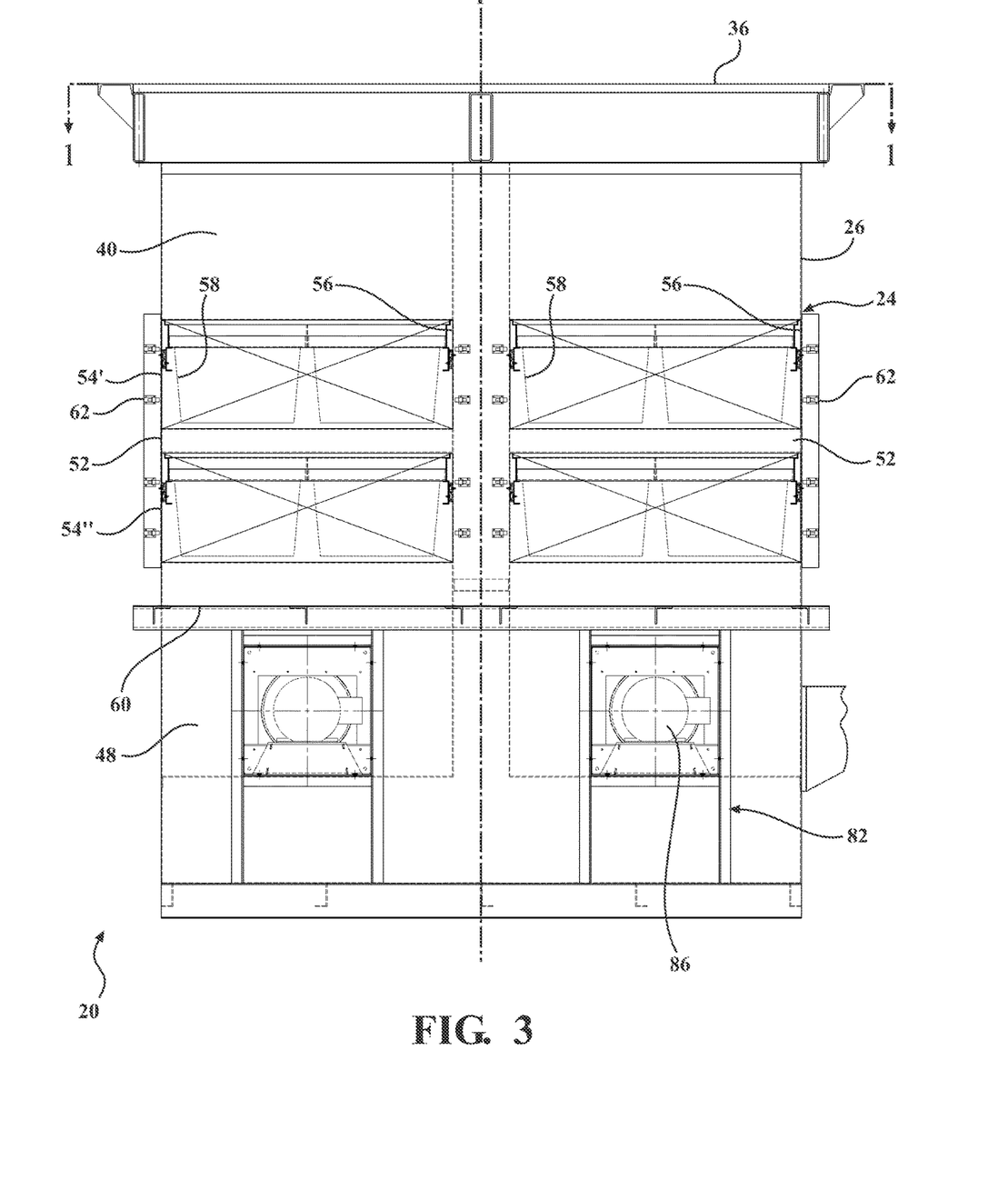
FIG. 3 is a cross-sectional side view of the paint booth assembly illustrating each of the upper and lower filter drawers including a filter compartment that houses a plurality of disposable filters, and a drawer slide establishing a slideable connection between each of the upper and lower filter drawers and one of the side walls of the paint booth.
Figure 4:
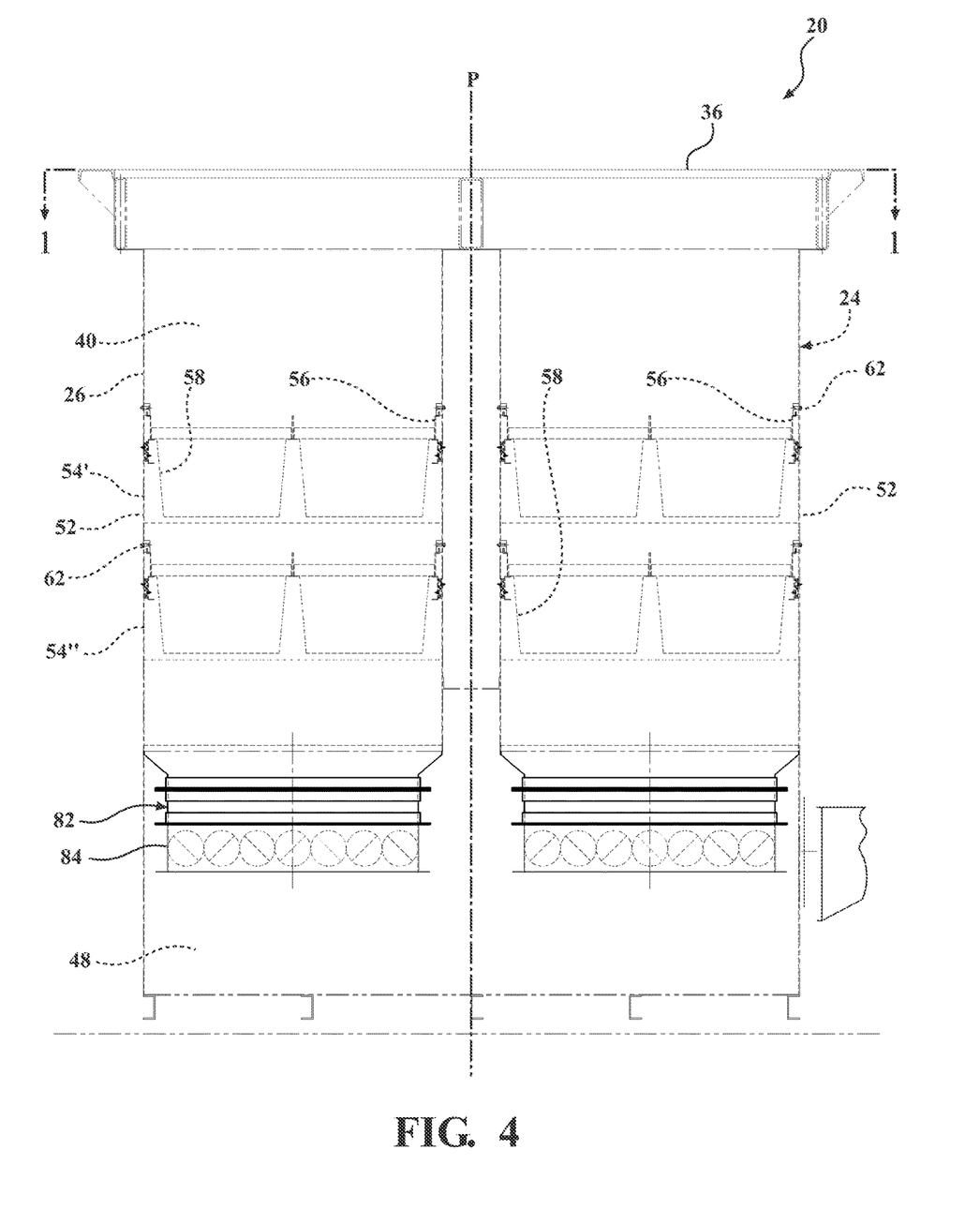
FIG. 4 is a cross-sectional side view of the paint booth assembly illustrating a baffle assembly disposed in the exhaust air chamber in fluid communication with the at least one filter module and including a plurality of baffles for controlling an amount of filtered air passing from the at least one filter module, into the exhaust air chamber and through an exhaust air duct extending outwardly from one of the side walls of the paint booth.
Figure 5:
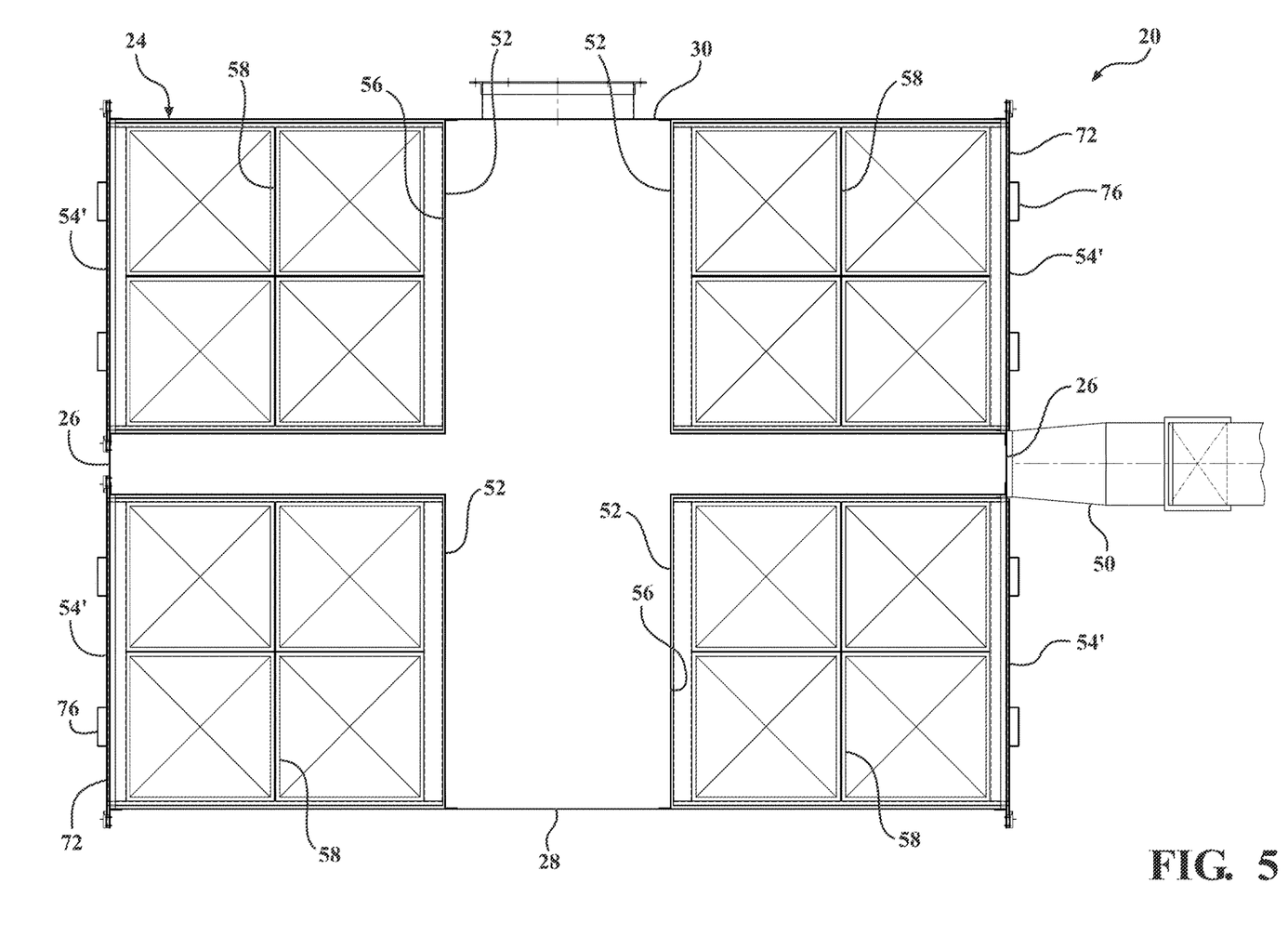
FIG. 5 is a top cross-sectional view of the paint booth assembly illustrating a plurality of filter modules arranged between an entry and exit end of the paint booth, with a first set of filter modules disposed adjacent and along one of the side walls and a second set of filter modules disposed adjacent and along the other of the side walls.
Figure 6:
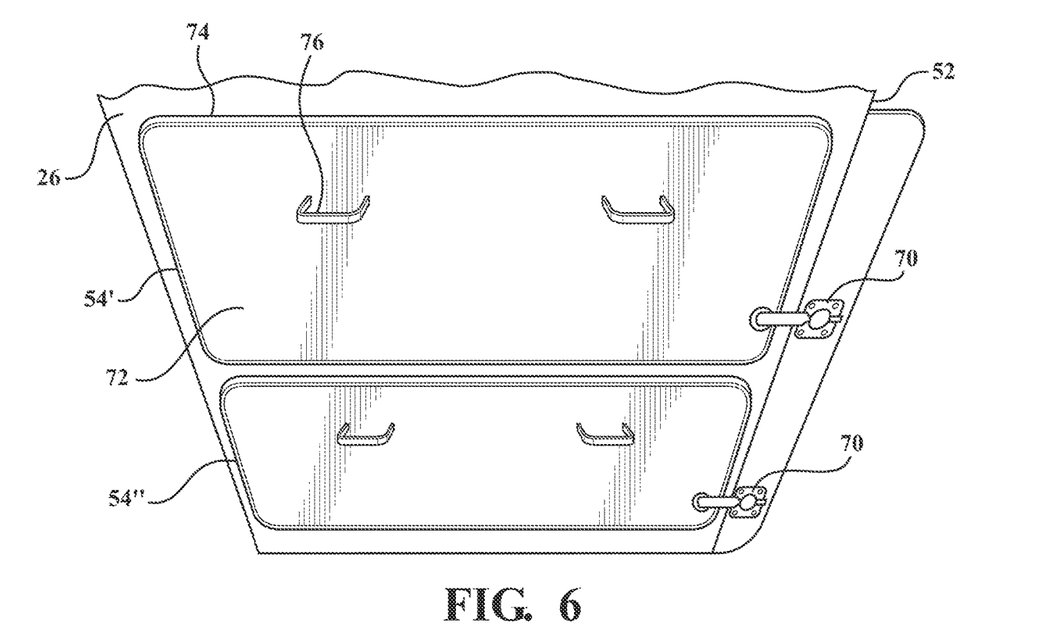
FIG. 6 is a magnified side view of a portion of FIG. 2 more clearly illustrating each of the filter drawers including a drawer front disposed in overlaying and abutting relationship with the side wall of the paint booth in the filtration positon and having at least one handle extending outwardly from the drawer front for allowing the paint booth operator to slide the filter drawer between the filtration and cleaning positions.
Figure 7:
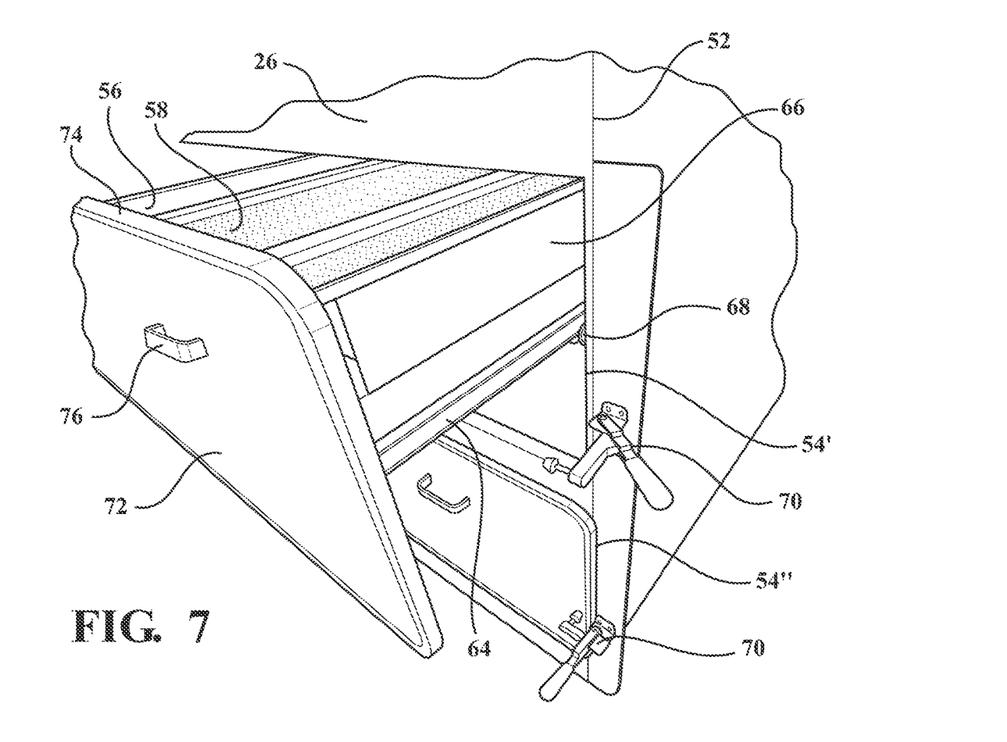
FIG. 7 is a perspective view of the at least one filter module illustrating a releaseable locking mechanism disposed adjacent each of the upper and lower filter drawers and the upper filter drawer sliding relative to the side wall of the paint booth from the filtering position to the cleaning position to illustrate the drawer slide including a track mounted along a drawer side and a rolling mechanism mounted to the side wall of the paint booth in mating relationship with the track.

As best illustrated in FIGS. 3-4 and 7, a drawer slide 62 preferably establishes the slideable connection between the plurality of filter drawers 54 and the paint booth 22. For example, the drawer slide 62 can include a track 64 mounted on opposing drawer sides 66 and a rolling mechanism 68 mounted to the side wall 22 of the paint booth 22 in mating relationship with the track 64 to allow the filter drawer 54 to slide relative to the paint booth 22. However, placement of the track 64 and the rolling mechanism 68 can be interchanged, or other means of establishing the slideable connection can be utilized without departing from the scope of the subject disclosure. As further illustrated in FIGS. 6-7, at least one releasable locking mechanism 64 is disposed adjacent each filter drawer 54 for securing the filter drawer 54 in the filtering (closed) position, and preventing downdraft air and paint particles from escaping out of the filter drawer 54 and into the environment of the paint booth. For example, the releasable locking mechanism 64 is preferably comprised of a clamp. However other releasable locking mechanisms could be utilized without departing from the scope of the subject disclosure. When the paint booth operator 39 desires to change the disposable filter 58 disposed within the filter drawer 54, the locking mechanism 64 is released or unlocked to allow the filter drawer 54 to be pulled or slid from the filtering position to the cleaning (open) position for allowing the paint booth operator 39 to access the filter compartment 56.

Figure 2:
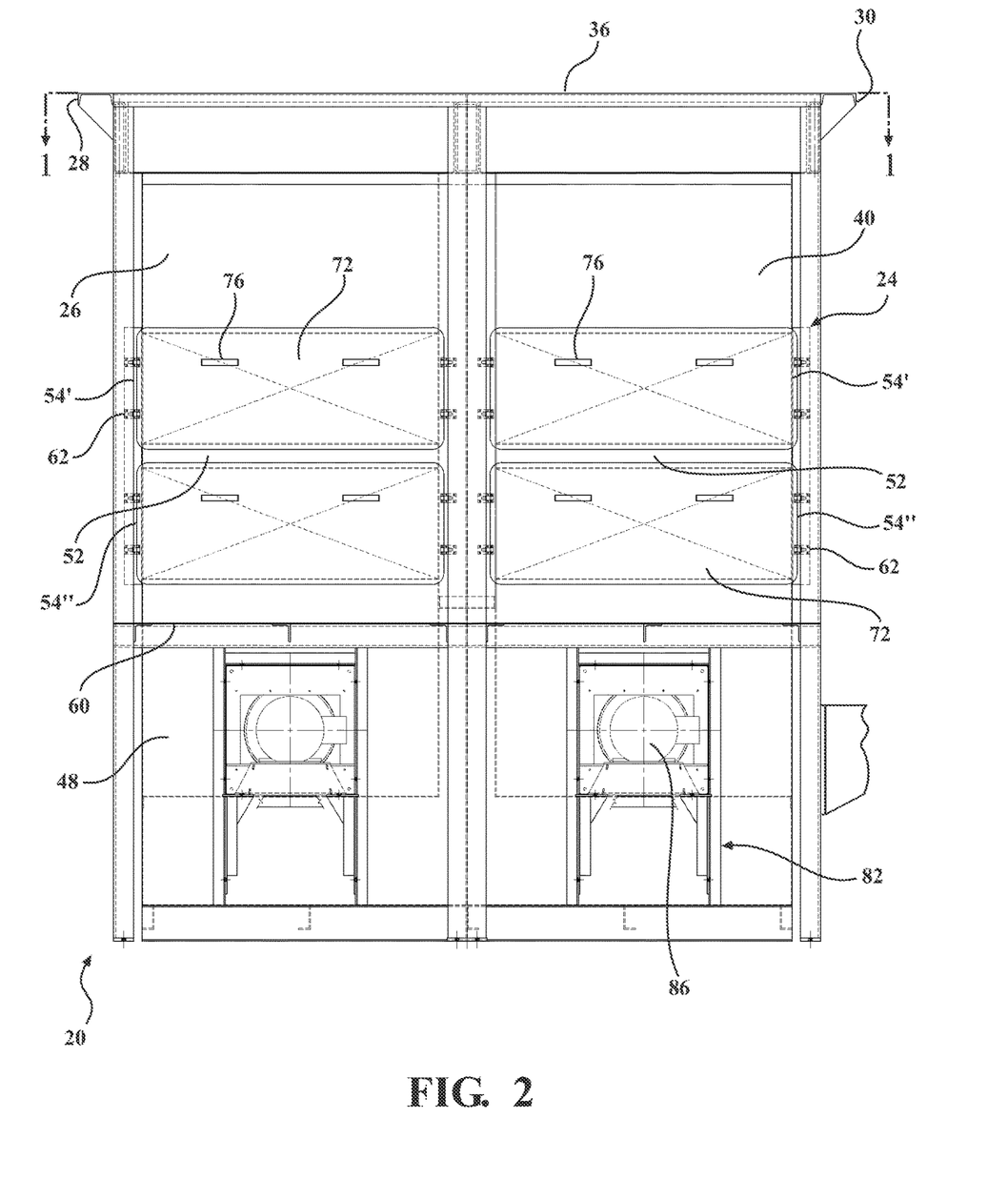
FIG. 2 is a side view of the paint booth assembly illustrating the plurality of drawers including an upper filter drawer disposed adjacent a grated floor and a spray portion of the paint booth and a lower filter drawer disposed adjacent an exhaust air chamber disposed below the paint filtration portion.
Figure 8:
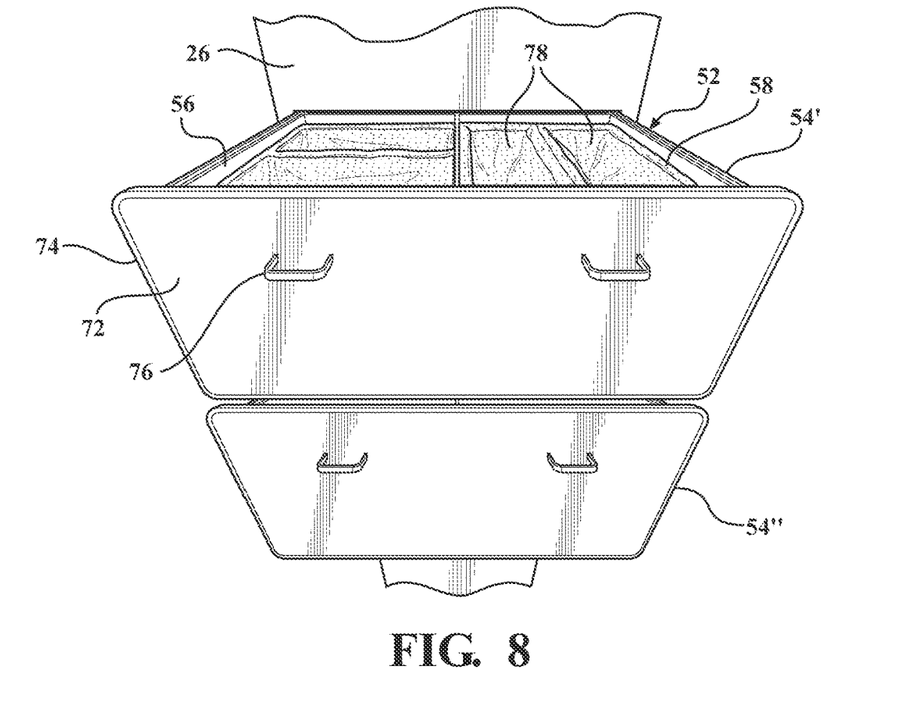
FIG. 8 is a top perspective view of the at least one filter module illustrating the upper filter drawer disposed in the cleaning position for allowing the paint booth operator to remove the disposable filter from the filter compartment.

As best illustrated in FIGS. 2, 6 and 8, each filter drawer 54 includes a drawer front 72 which extends transversely to the drawer sides 66 in parallel and spaced relationship to the central plane P of the paint booth 22. The drawer front 72 is disposed in overlaying and abutting relationship with the side wall 26 of the paint booth 22 when the filter drawer 54 is disposed in the filtration position to close the filter drawer 54 and isolate the paint filtration portion 40 from the environment of the paint booth 22. A seal 74 extends around a perimeter of the drawer front 72 and is disposed in abutting and compressed relationship with the side wall 26 when the filter drawer 54 is closed and the releasable locking mechanism 70 is locked to establish a seal between the filter drawer 54 and the side wall 26 of the paint booth 22 for preventing paint particles from escaping into the environment. At least one handle 76 extends outwardly from the drawer front 72 for allowing the paint booth operator 39 to pull and push the filter drawer 54 between the filtration ("closed") and cleaning ("open") positions.

The plurality of filter drawers 54 for the filter module 52 includes an upper filter drawer 54' disposed adjacent the grated floor 36 and the spray portion 38 of the paint booth 22 and a lower filter drawer 54" disposed adjacent the exhaust air chamber 48 and the exhaust air duct 50. Thus, the upper filter drawer 54' in the filter module 52 is arranged to first receive the downdraft of air from the spray portion 38 of the spray booth for initially filtering the paint entrained in the downdraft of air with the at least one disposable filter 58' housed within the respective filter compartment 56. Correspondingly, the lower filter drawer 54" is arranged to lastly receive the downdraft of air for conducting a final filtration of the downdraft of air before the filtered downdraft air exits to the exhaust air chamber 48 and the exhaust air duct 50. Although the plurality of drawers 54 are illustrated as including only an upper filter drawer 54' and a lower filter drawer 54", other intermediate or middle drawers could be placed between the upper and lower filter drawers 54', 54", such as to increase the filtering capacity and capabilities of the filter module 52.

Figure 9:
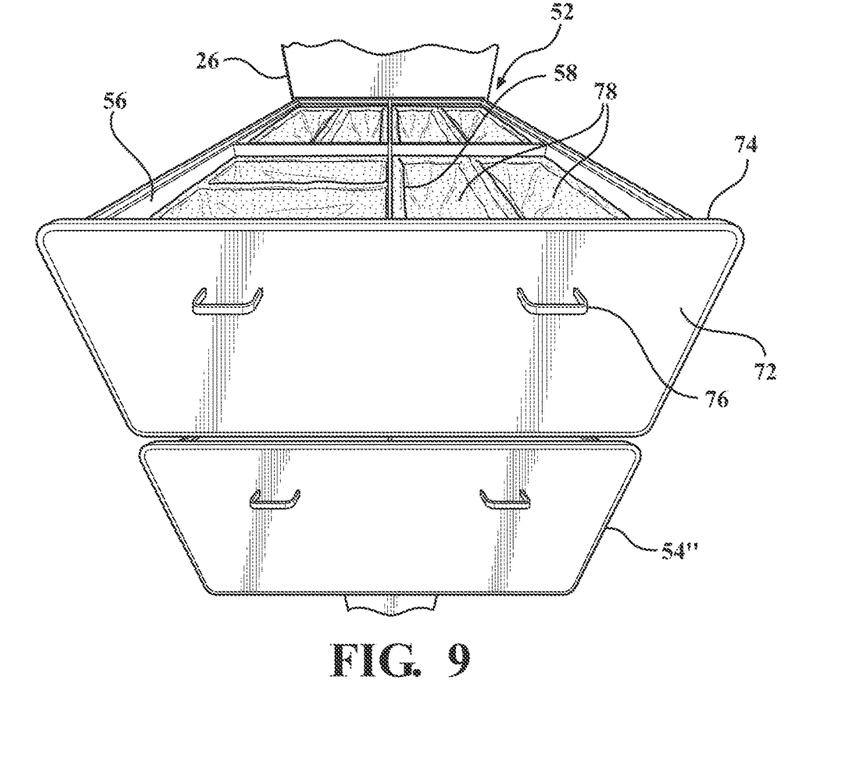
FIG. 9 is a magnified view of a portion of FIG. 8 illustrating the at least one disposable filter for the upper filter drawer comprised of a plurality of cube filters each defining a plurality of pockets.
Figure 10:
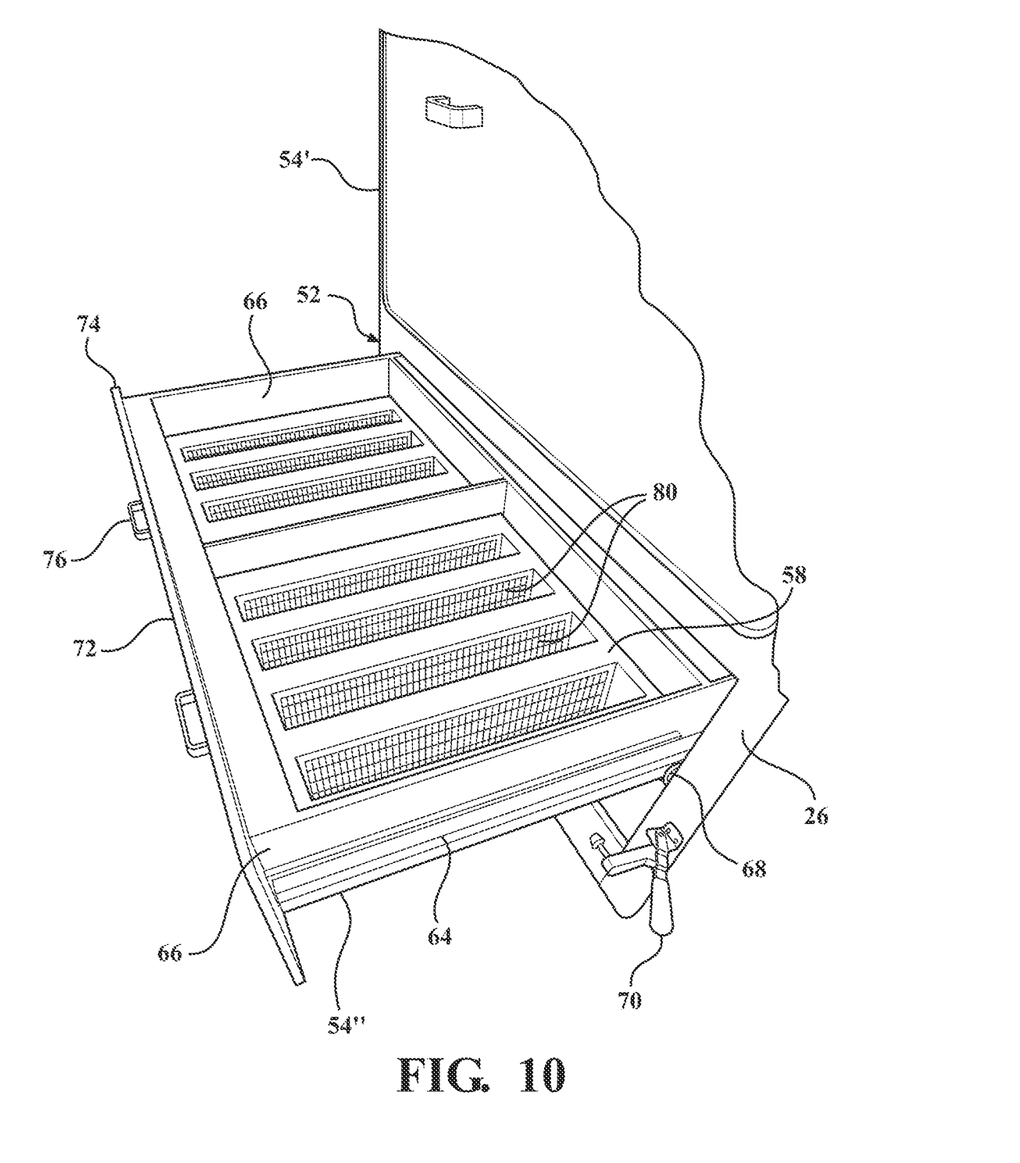
FIG. 10 is a perspective view of the at least one filter module illustrating the lower filter drawer disposed in the cleaning position and the at least one disposable filter disposed in the filter compartment of the lower filter drawer comprised of a plurality of disposable pleat filters.
Figure 11:
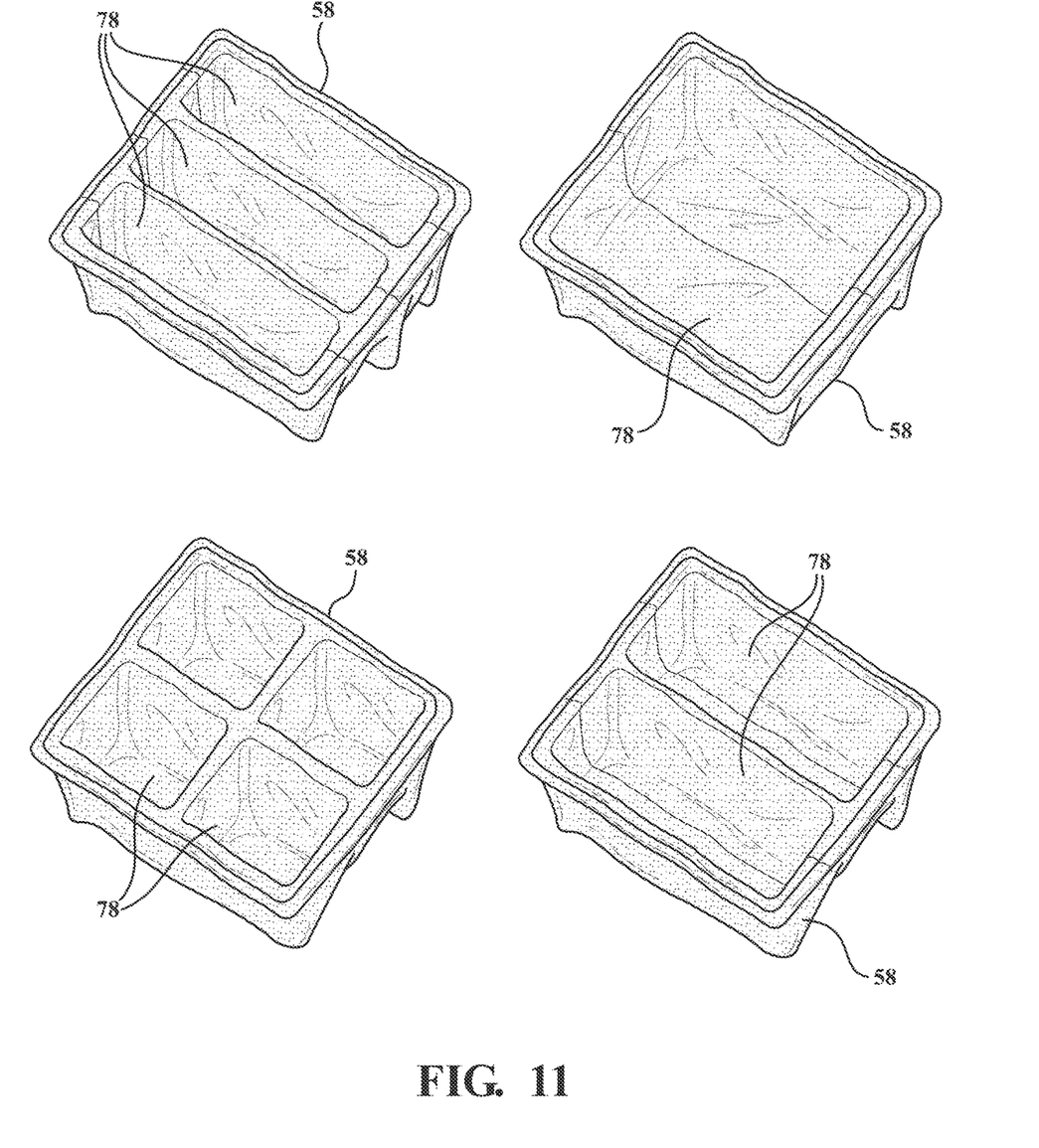
FIG. 11 is a perspective view of the disposable cube filter illustrating various arrangements of the plurality of filter pockets.
Figure 12:
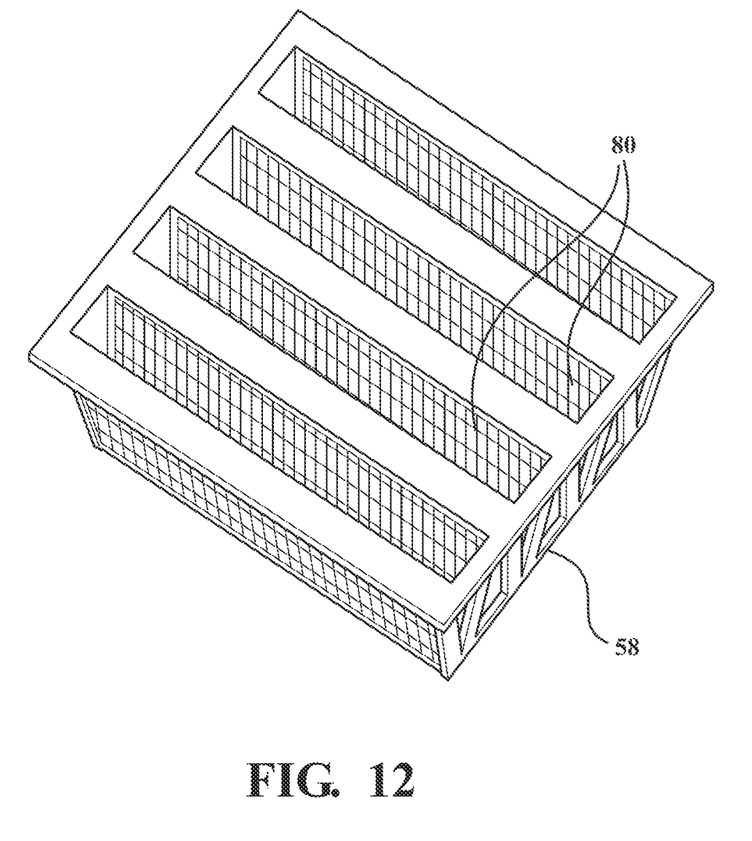
FIG. 12 is a perspective view of the disposable pleated filter.

As best illustrated in FIGS. 8-9 and 11, the at least one disposable filter 58 housed in the filter compartment 56 of the upper filter drawer 54' is preferably a cube filter 58' defining a plurality of filter pockets 78. As further illustrated in FIGS. 8-9 the upper filter drawer 54' preferably includes a plurality of disposable cube filters 58' disposed in the filter compartment 56 to initially filter paint from the downdraft of air passing through the filter module 52. As best illustrated in FIGS. 10 and 12, the at least one disposable filter 58 housed in the filter compartment 56 of the lower filter drawer 54" is preferably a pleat filter 58" including a plurality of pleated sections 80. Similar to the upper filter drawer 54', the lower filter drawer 54" preferably includes a plurality of disposable pleat filters 58" disposed in the lower filter compartment for conducting a final filtration of any residual paint particles or other contaminants from the downdraft of air before the filtered air exits the filter module 52 and is passed to the exhaust air chamber 48 and the exhaust air duct 50 for recirculation to the plenum 44.

As best illustrated in FIGS. 2-5, the at least one filter module 52 of the paint booth 22 preferably includes a plurality of filter modules 52 arranged between the entry and exit ends 28, 30 of the paint booth 22, with a first set of filter modules 52 disposed adjacent and along one of the side walls 26 and a second set of filter modules 52 disposed adjacent and along the other one of the side walls 26. In each of the first and second sets, the filter modules 52 are placed serially between the entry and exit ends 28, 30 of the paint booth 22 at a predetermined filter module spacing, such as with one filter module 52 placed per five foot length of the paint booth 22. However, other preferred filter module spacing could be utilized without departing from the scope of the subject disclosure. In this first and second set filter module arrangement, the downdraft of air exiting the spray portion 28 of the paint booth is directed to either side of the central plane P in the paint filtration portion 40 and downwardly towards the first and second set of filter modules 52 for filtering paint from the downdraft of air by the plurality of filter drawers 54.

As noted previously, after the downdraft of air has been filtered by the filter module(s) 52, the filtered air enters the exhaust air chamber 48 and is subsequently routed through the exhaust air duct 50 extending from the paint booth 22 to an exhaust air fan for recirculation. As best illustrated in FIGS. 2-4, at least one baffle assembly 82 is disposed in the exhaust air chamber 48 in fluid communication with the at least one filter module 52 for adjusting a flow of filtered air passing from the filter module 52 into the exhaust air chamber 48. For example, as best illustrated in FIG. 4, the baffle assembly 82 can include a plurality of baffles 84 which are adjustable by a motor 86 to control an amount of filtered air capable of passing from the filter module 52 to the exhaust air chamber 48.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A paint booth assembly including a dry filtration system for removing paint particles from a downdraft of air, the paint booth assembly comprising:
    a paint booth having a pair of side walls;
    a grated floor extending between said pair of side walls to separate said paint booth between a spray portion disposed above said grated floor and a paint filtration portion disposed below said grated floor;
    at least one filter module disposed in said paint filtration portion for receiving a downdraft of process air including entrained paint particles from said spray portion;
    said at least one filter module including a plurality of filter drawers sequentially arranged in stacking relationship relative to one another along a flow path of the downdraft of process air passing through said at least one filter module;
    each of said plurality of filter drawers defining a filter compartment housing at least one disposable filter; and
    each of said plurality of filter drawers slideably connected to said paint booth and slideable between a filtering position wherein said filter compartment is disposed within said paint filtration portion for filtering paint particles from the downdraft of process air with said at least one disposable filter to a cleaning position wherein said filter compartment is slid relative to said pair of side walls to an outside environment of the paint booth for allowing said at least one disposable filter to be removed and replaced by a paint booth operator.

2. The paint booth assembly as set forth in claim 1, further comprising at least one drawer slide slideably interconnecting each of said plurality of filter drawers with one of said side walls of said paint booth.

3. The paint booth assembly as set forth in claim 2, wherein said at least one drawer slide includes a track mounted on opposing drawer sides of each one of said plurality of filter drawers and a rolling mechanism mounted to each one of said pair of side walls and disposed in mating relationship with said track for allowing said respective one of said plurality of filter drawers to slide relative to said side wall of said paint booth.

4. The paint booth assembly as set forth in claim 3, where each one of said plurality of filter drawers includes a drawer front extending transversely to said opposing drawer sides and disposed in overlaying relationship with each one of said pair of side walls when said respective one of said plurality of filter drawers is disposed in the filtration position.

5. The paint booth assembly as set forth in claim 4, further comprising at least one handle extending outwardly from said drawer front for allowing the paint booth operator to slide said respective one of said plurality of filter drawers between the filtration and cleaning positions.

6. The paint booth assembly as set forth in claim 4, further comprising at least one releasable locking mechanism disposed adjacent each one of said plurality of filter drawers for releaseably securing said respective one of said plurality of filter drawers in the filtering position.

7. The paint booth assembly as set forth in claim 6, wherein said releasable locking mechanism is comprised of a clamp.

8. The paint booth assembly as set forth in claim 6, further comprising a seal extending around a perimeter of said drawer front and disposed in abutting and compressed relationship with said respective one of said side walls when said respective one of said plurality of filter drawers is disposed in the filtering position and said releasable locking mechanism is locked for establishing a seal between said respective one of said plurality of filter drawers and said respective one of said side walls.

9. The paint booth assembly as set forth in claim 1, wherein said plurality of filter drawers includes an upper filter drawer disposed adjacent said grated floor and said spray portion of said paint booth and a lower filter drawer disposed adjacent an exhaust air chamber of said paint booth.

10. The paint booth assembly as set forth in claim 9, wherein said at least one disposable filter housed in said filter compartment of said upper filter drawer is comprised of a cube filter defining a plurality of filter pockets, and wherein said at least one disposable filter housed in said filter compartment of said lower filter drawer is comprised of a pleat filter including a plurality of pleated sections.

11. The paint booth assembly as set forth in claim 1, wherein said at least one filter module includes a plurality of filter modules arranged serially between said entry and exit ends of said paint booth.

12. The paint booth assembly as set forth in claim 11, wherein said plurality of filter modules includes a first set of filter modules disposed adjacent and along one of said side walls and a second set of filter modules disposed adjacent and along the other one of said side walls.

13. The paint booth assembly as set forth in claim 1, further comprising a filter drawer access platform extending along at least one of said side walls adjacent said at least one filter module for allowing the paint booth operator to access and selectively slide said plurality of filter drawers between the filtering and cleaning positions.

* * * * *